UNITED STATES PATENT OFFICE.

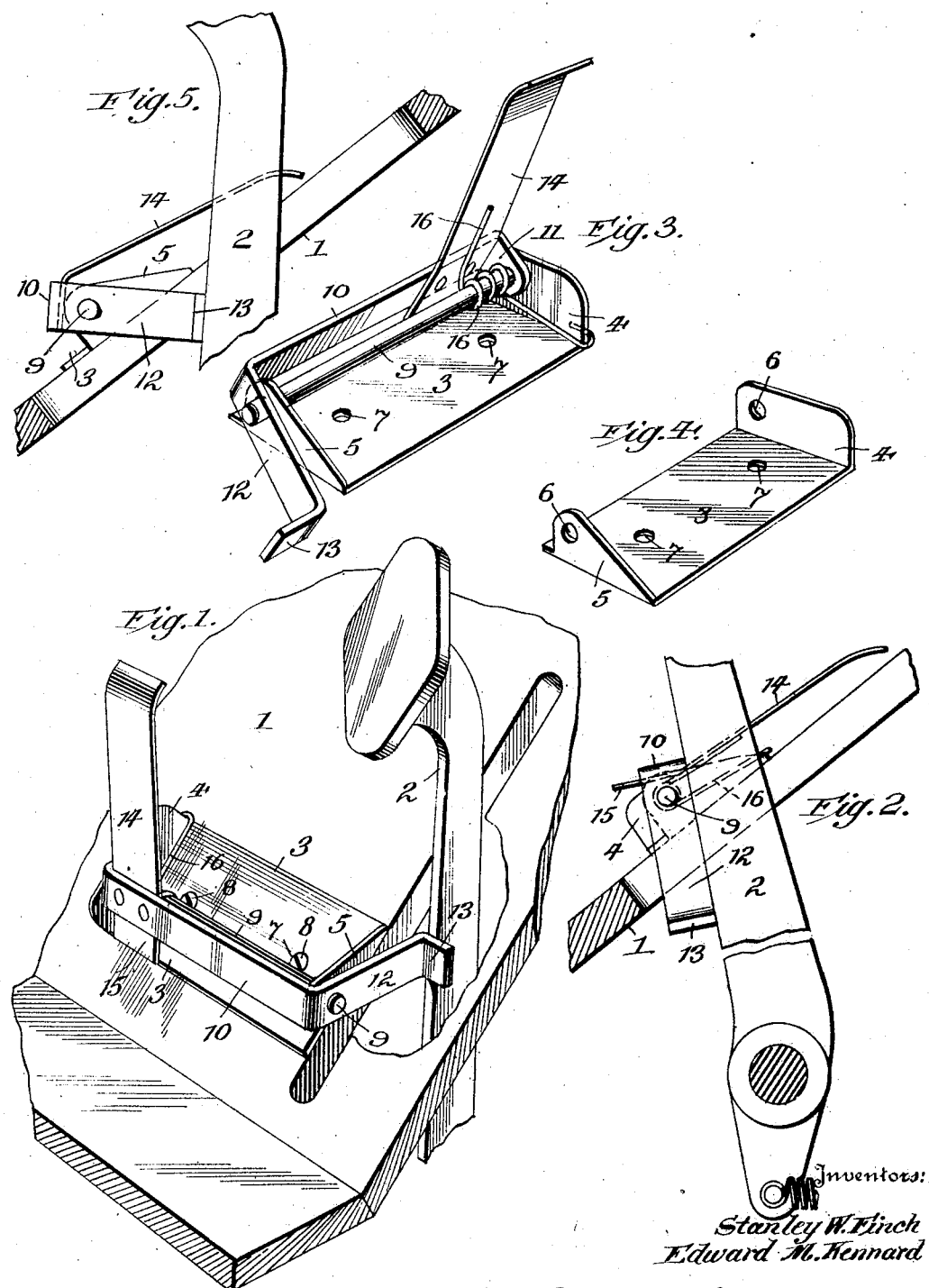

STANLEY W. FINCH, OF WASHINGTON, DISTRICT OF COLUMBIA, AND EDWARD M. KENNARD, OF CLARENDON, VIRGINIA.

TRANSMISSION-CONTROL DEVICE FOR MOTOR-VEHICLES.

1,392,316.           Specification of Letters Patent.      Patented Oct. 4, 1921.

Application filed November 5, 1920. Serial No. 421,946.

*To all whom it may concern:*

Be it known that we, STANLEY W. FINCH and EDWARD M. KENNARD, citizens of the United States, residing, respectively, at Washington, District of Columbia, and Clarendon, county of Arlington, State of Virginia, have invented certain new and useful Improvements in Transmission-Control Devices for Motor-Vehicles, of which the following is a specification.

This invention pertains to an improved pedal-lever controlling mechanism and is designed more particularly for use in conjunction with the high and low gear foot pedal employed upon the Ford car, the structure being designed to hold the pedal in neutral position.

In the operation of an automobile wherein a single pedal controlled lever is employed to throw the engine into low or high gear, the operator of the machine, particularly if he be a beginner, is apt to stall the engine by allowing the lever to pass from the neutral position (intermediate the high and low positions) back into high. Such stalling oftentimes leads to series consequences.

The present invention has for its object the production of a simple and effective device which may be readily attached to the foot-board of a car of the type above specified, the device being such that it will function with the lever without change or alteration in any part of the machine to arrest and hold the lever in neutral position until released.

The invention is illustrated in the annexed drawings, wherein,—

Figure 1 is a perspective view of one form of the device shown in operative relation to a pedal-lever, the latter being in the neutral position intermediate high and low;

Fig. 2 an end elevation showing the position of the parts when the lever is in high;

Fig. 3 a perspective view of the control device;

Fig. 4 a similar view of the base plate thereof; and

Fig. 5 an end elevation showing a slightly modified arrangement.

Referring first to Figs. 1 to 4 inclusive, 1 denotes the foot-board of an automobile and 2 the pedal actuated lever. In Fig. 1 the lever is shown in its intermediate neutral position; when pushed forward it throws the engine in low gear, and when it is allowed to swing rearwardly to the position in Fig. 2 the engine is in high. The control mechanism or device for holding the lever in neutral may be said to comprise a base-plate, a swinging bail or frame to which latter is attached a locking arm which functions with the foot-lever 2, and a pedal through which the bail may be actuated in one direction, a spring being employed to move it in the opposite direction. The base plate, see Fig. 4, is formed of a single piece of plate metal, bent to form, and comprises a base proper 3 having upstanding ends 4 and 5, each of which is provided with a hole or eye 6. The base has formed therein openings 7 through which screws 8 are passed to secure the base in position.

A rod 9 passes through and is swiveled in the openings 6 and a bail shaped member is mounted on the rod or pin. Said member is preferably formed from a single piece of stock, bent to form, and may be said to comprise a main body or cross bar 10, having an ear or lug 11 at one end, while at the opposite end there is provided a lever or arm 12, the extremity of which is bent laterally at right angles producing a stop finger or lug 13. Said stop finger, when the parts are positioned, stands in the path of lever 1 and abuts squarely against the same when the parts are in the position shown in Fig. 1. Cross bar 10 has secured to it adjacent the ear 11, a pedal or lever 14, the lower end whereof, as at 15, extends below the bar and contacts the base 3, forming in effect a stop to limit the rearward swinging movement of the swinging frame. By bending this extension 15 one way or another the position of stop finger 13, with reference to lever 2, may be regulated to effect the square abutment of the finger against the lever. The position or angularity of the pedal in neutral varies in different cars and by this simple means the parts may be readily fitted.

A coiled spring 16, the main body whereof encircles the rod 9 has one end contacting lever pedal 14 and its opposite end hooked around the upstanding end 4, the spring acting to hold lever 14 in its elevated position with the arm 12 at right angles to lever 2 and the finger 13 in line with the lever.

When the parts are in the position shown in Fig. 1, the lever 2 is held in neutral; forward movement of the lever to low gear position is not precluded—but a slight touch of the foot upon lever 14 will carry finger 13 downwardly so that lever 2 may move rearwardly into high gear position when the parts will assume the relation disclosed in Fig. 2, arm 12 passing down through the slot in the foot-board. When passing from high to neutral, all the operator has to do is to move the lever 2 forward and the arm 12 will swing upwardly carrying fingers 13 into locking relation.

In Fig. 5 a slightly different relative arrangement of the parts is illustrated. In this instance pedal 14 when depressed carries arm 12 downwardly and finger 13 into locking relation with lever 2; the only difference in structure being one of angular relation between pedal 14 and the arm 12 of the swinging bail or frame. Forward movement of the lever 2 will release the finger and the spring will throw the arm 12 upwardly so that lever 2 will clear the same and move back into high gear position.

Under the preferred construction, shown in Figs. 1 to 4, the device comes into action when the transmission control lever 2 is moved forwardly from high to intermediate and prevents the accidental rearward movement of said lever with the consequent stalling of the motor. With the construction shown in Fig. 5 the lever 2 may be thrown into neutral position by merely depressing pedal-lever 14. Moreover, under both constructions the lever is held in true neutral and prevents undue wear of the parts which occurs when the operator seeks to hold the lever in neutral position by his foot. It likewise does away with the operation of the shifting of the hand lever found upon Ford cars, which is employed by many drivers for holding the lever in neutral.

In congested traffic, with the car standing still, it often becomes necessary for one to back his car owing to the fact that the car ahead is backed, and having the lever 2 in true neutral enables the operator to throw in the reversing clutch without fear of stalling the engine.

What is claimed is,—

1. In combination with the transmission positioning lever of an automobile; a base adapted to be secured to a fixed portion to one side of the lever; a bail shaped frame pivotally mounted on the base; an arm extending outwardly from that end of the frame adjacent the lever; a finger extending from the arm into the path of movement of the lever; a spring acting to rock the frame upwardly; and a foot lever secured to the frame for moving the same in opposition to the spring.

2. In a device for holding the transmission lever of an automobile in neutral position, the combination of a base plate having upstanding ears at opposite ends; a rod mounted in said ears; a bail-shaped member supported on said rod, said member having an extended arm at one end, and a finger extending laterally from the arm; a spring tending to swing the bail shaped member rearwardly; and a pedal lever secured to the bail.

3. In a device for holding the transmission lever of an automobile in neutral position, the combination of a base plate having upstanding ears at opposite ends; a rod mounted in said ears; a bail-shaped member supported on said rod, said member having an extended arm at one end of the cross-bar thereof, and a finger extending laterally from the arm; a spring tending to swing the bail shaped member rearwardly; and a pedal lever secured to the cross bar of the bail, the lower end of the pedal lever contacting the base plate and serving as a stop to limit the swinging movement of the bail under action of the spring.

In testimony whereof we have signed our names to this specification.

STANLEY W. FINCH.
EDWARD M. KENNARD.